US012786805B2

(12) United States Patent
Neuhaeuser

(10) Patent No.: US 12,786,805 B2
(45) Date of Patent: Nov. 3, 2026

(54) ACTIVE CALL HANDOVER

(71) Applicant: Bayerische Motoren Werke Aktiengesellschaft, Munich (DE)

(72) Inventor: Michael Neuhaeuser, Sankt Wolfgang (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 668 days.

(21) Appl. No.: 17/801,744

(22) PCT Filed: Feb. 24, 2020

(86) PCT No.: PCT/EP2020/054769
§ 371 (c)(1),
(2) Date: Aug. 23, 2022

(87) PCT Pub. No.: WO2021/170206
PCT Pub. Date: Sep. 2, 2021

(65) Prior Publication Data
US 2023/0088874 A1 Mar. 23, 2023

(51) Int. Cl.
*H04W 36/00* (2009.01)
*H04L 65/1094* (2022.01)
*H04L 65/1096* (2022.01)
*H04W 4/16* (2009.01)

(52) U.S. Cl.
CPC ..... *H04W 36/0011* (2013.01); *H04L 65/1094* (2022.05); *H04L 65/1096* (2013.01); *H04W 4/16* (2013.01)

(58) Field of Classification Search
CPC . H04W 36/0011; H04W 4/16; H04L 65/1094; H04L 65/1096
See application file for complete search history.

(56) References Cited

U.S. PATENT DOCUMENTS 9,197,848 B2 * 11/2015 Felkai .................... H04L 65/403
10,530,932 B2 * 1/2020 Tevonian ............ H04L 65/1063
2006/0256751 A1 * 11/2006 Jagadeesan ......... H04L 65/1083 370/331
(Continued)

FOREIGN PATENT DOCUMENTS

CN 101986737 A 3/2011
CN 103997496 A 8/2014
(Continued)

OTHER PUBLICATIONS

Chinese-language Chinese Office Action issued in Chinese Application No. 202080095501.6 dated Aug. 1, 2024, with English translation (16 pages).
(Continued)

*Primary Examiner* — Angela Widhalm de Rodriguez
(74) *Attorney, Agent, or Firm* — Crowell & Moring LLP

(57) ABSTRACT

A method for an active call handover includes receiving, at a mobile network operator (MNO), a handover request to transfer an active call, which is currently active between a first user equipment (UE) and a third-party device, from the first UE to a second UE. The MNO sends a first invitation message to the second UE and a second invitation message to the third-party device. The active call is transferred from the first UE to the second UE.

15 Claims, 12 Drawing Sheets

(56) References Cited

U.S. PATENT DOCUMENTS

| | | | | |
|---|---|---|---|---|
| 2008/0243999 | A1* | 10/2008 | Pazhyannur | H04L 65/1089 717/177 |
| 2014/0226628 | A1* | 8/2014 | Helbert | H04W 36/1446 370/331 |
| 2016/0088465 | A1* | 3/2016 | Golla | H04W 8/205 455/450 |
| 2017/0222991 | A1* | 8/2017 | Yang | H04L 9/0825 |
| 2017/0279619 | A1* | 9/2017 | Yang | H04L 9/3268 |
| 2017/0332274 | A1* | 11/2017 | Link, II | H04M 15/851 |
| 2018/0027480 | A1* | 1/2018 | Narasimhan | H04W 12/04 455/435.1 |
| 2018/0302781 | A1* | 10/2018 | Lee | H04W 12/069 |
| 2019/0373027 | A1* | 12/2019 | Ravichandran | H04L 65/1093 |
| 2020/0322884 | A1* | 10/2020 | Di Girolamo | H04W 12/06 |
| 2020/0413234 | A1* | 12/2020 | Shah | H04M 15/77 |

FOREIGN PATENT DOCUMENTS

| | | | | |
|---|---|---|---|---|
| CN | 109348419 | A | 2/2019 | |
| EP | 3 416 436 | A1 | 12/2018 | |
| JP | 2008-98750 | A | 4/2008 | |
| WO | WO 2016/032533 | A1 | 3/2016 | |
| WO | WO-2018120674 | A1 * | 7/2018 | H04W 4/48 |

OTHER PUBLICATIONS

PCT/EP2020/054769, International Search Report dated Nov. 12, 2020 (Three (3) pages).

English translation of Chinese-language Office Action issued in Chinese Application No. 202080095501.6 dated Oct. 31, 2024 (7 pages).

* cited by examiner re-INVITE expiry during push call when leaving the car re-INVITE error during push call when leaving the car

ACTIVE CALL HANDOVER

BACKGROUND AND SUMMARY OF THE INVENTION

Embodiments of the present disclosure relate to a method for an active call handover, a computer readable storage medium, a server of a mobile network operator, and a user equipment. The embodiments of the present disclosure particularly relate to a smooth call handover from a first user equipment of the user to a second user equipment of the user.

Wireless communication systems are rapidly growing in usage. In particular, a user may have a variety of devices that should be equipped with communication capabilities. Such devices can be a smart phone, a tablet, a smart watch and a car. Due to certain limitations imposed by a mobile network operator, it may be difficult or even impossible to transfer an active call between two devices of the user.

In view of the above, a method for an active call handover, a computer readable storage medium, a server of a mobile network operator, and a user equipment, that overcome at least some of the problems in the art are beneficial.

In light of the above, a method for an active call handover, a computer readable storage medium, a server of a mobile network operator, and a user equipment are provided.

It is an object of the present disclosure to enable a communication function of a user equipment. Particularly, it is an object of the present disclosure to provide a smooth call handover from a first user equipment of the user to a second user equipment of the user.

The objects are solved by the features of the independent claims. Preferred embodiments are defined in the dependent claims.

According to an independent aspect of the present disclosure, a method for an active call handover is provided. The method includes receiving, at a mobile network operator, MNO, a handover request to transfer an active call, which is currently active between a first user equipment, UE, and a third-party device, from the first UE to a second UE; sending, by the MNO, a first invitation message to the second UE and a second invitation message to the third-party device; and transferring the active call from the first UE to the second UE.

According to some embodiments, which can be combined with other embodiments described herein, the first UE uses a first communication profile of the user for communication over a mobile network, and the second UE uses a second communication profile of the user for communication over the mobile network.

According to some embodiments, which can be combined with other embodiments described herein, the first communication profile and the second communication profile have a same telephone number. In the present case, the term "telephone number" refers to a public known telephone number. Technically, there are different MSISDNs available for each device.

According to some embodiments, which can be combined with other embodiments described herein, the first communication profile is an eSIM profile of the user, and the second communication profile is an eSIM profile of the user. However, the present disclosure is not limited thereto, and other communication profiles can be used, such as conventional SIMs and non-SIM profiles.

The eSIM (embedded subscriber identity module) is a standardized procedure for the secure embedding of subscriber information in a module of a telecommunications device. For communication via eSIM, security or data confidentiality is crucial. For this purpose, the module contains a standardized digital certificate. Worldwide, a large number of different certificates exist, whereby a certain type of eSIM only works with a certain type of certificate.

According to some embodiments, which can be combined with other embodiments described herein, the handover request to transfer the active call is sent by either the first UE or the second UE to the MNO.

According to some embodiments, which can be combined with other embodiments described herein, the method further includes sending, by the MNO, a termination message to the first UE.

According to some embodiments, which can be combined with other embodiments described herein, if a timeout period of at least one of the handover request, the first invitation message and the second request expires, the active call handover is aborted and the active call is restored between the first UE and the second UE.

According to some embodiments, which can be combined with other embodiments described herein, if an error in at least one of the handover request, the first invitation message and the second request occurs, the active call handover is aborted and the active call is restored between the first UE and the second UE.

According to some embodiments, which can be combined with other embodiments described herein, the first UE and the second UE are selected from the group including a mobile terminal, a communication module, a communication module of a vehicle, and a vehicle.

The term "user equipment" includes computer devices which are mobile (e.g. vehicles) and/or portable (e.g. smartphones) and which are configured for wireless communication. Examples of UE devices include mobile telephones or smart phones, portable gaming devices, laptops, wearable devices (e.g. smart watches, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is capable of wireless communication.

The term "vehicle" includes passenger cars, trucks, buses, campers, motorcycles, etc., which are used to transport people, goods, etc. In particular, the term includes motor vehicles for the transport of persons.

The term "mobile terminal" includes in particular smartphones, but also other mobile telephones or cell phones, personal digital assistants (PDAs), tablet PCs, smart watches, smart glasses, and all current and future electronic devices that are equipped with communication technology.

According to another independent aspect of the present disclosure, a computer readable storage medium is provided. The computer readable storage medium includes instructions which, when executed on one or more processors, cause the one or more processors to perform the method for an active call handover of the present disclosure.

The term "computer readable storage medium" includes various types of non-transitory memory devices or storage devices. The term "storage medium" is intended to include a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The storage medium may include other types of non-transitory memory as well or combinations thereof.

According to another independent aspect of the present disclosure, a server of a mobile network operator, MNO, is provided, including one or more processors configured to: receive a handover request to transfer an active call, which is currently active between a first user equipment, UE, and a third-party device, from the first UE to a second UE; send a first invitation message to the second UE and a second invitation message to the third-party device; and transfer the active call from the first UE to the second UE.

According to another independent aspect of the present disclosure, a (first) user equipment, UE, in particular a vehicle, is provided, including one or more processors configured to: send, to a mobile network operator, MNO, a handover request to transfer an active call, which is currently active between the user equipment, UE, and a third-party device, from the UE to another UE; and terminate the active call.

According to another independent aspect of the present disclosure, a (second) user equipment, UE, in particular a mobile terminal, is provided, including one or more processors configured to: receive, from a MNO, a first invitation message to transfer an active call, which is currently active between another user equipment, UE, and a third-party device, from the other UE to the UE; and enable the active call transferred from the other UE.

According to another independent aspect of the present disclosure, a system is provided. The system includes at least the server of a mobile network operator and the (first) user equipment of the present disclosure.

According to some embodiments, which can be combined with all of the embodiments described herein, the messaging is based on the standard 3GPP TS 24.337 Version 15.

Further aspects, benefits, and features of the present disclosure are apparent from the claims, the description, and the accompanying drawings.

Embodiments are also directed at devices for carrying out the disclosed methods and include device parts for performing each described method aspect. These method aspects may be performed by way of hardware components, a computer programmed by appropriate software, by any combination of the two or in any other manner. Furthermore, embodiments according to the invention are also directed at methods for operating the described servers and user equipment. It includes method aspects for carrying out every function of the servers and user equipment.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION OF THE DRAWINGS

Reference will now be made in detail to the various embodiments of the disclosure, one or more examples of which are illustrated in the figures. Within the following description of the drawings, the same reference numbers refer to same components. Generally, only the differences with respect to individual embodiments are described. Each example is provided by way of explanation of the disclosure and is not meant as a limitation of the disclosure. Further, features illustrated or described as part of one embodiment can be used on or in conjunction with other embodiments to yield yet a further embodiment. It is intended that the description includes such modifications and variations.

Although the embodiments of the present disclosure are described with reference to a vehicle, it is to be understood that the present disclosure is not limited thereto and that the embodiments described herein may be implemented in and/or used with a number of different types of UE devices, including but not limited to cellular phones, tablet computers, wearable computing devices, portable media players, vehicles, and any of various other computing devices.

Figure 1:
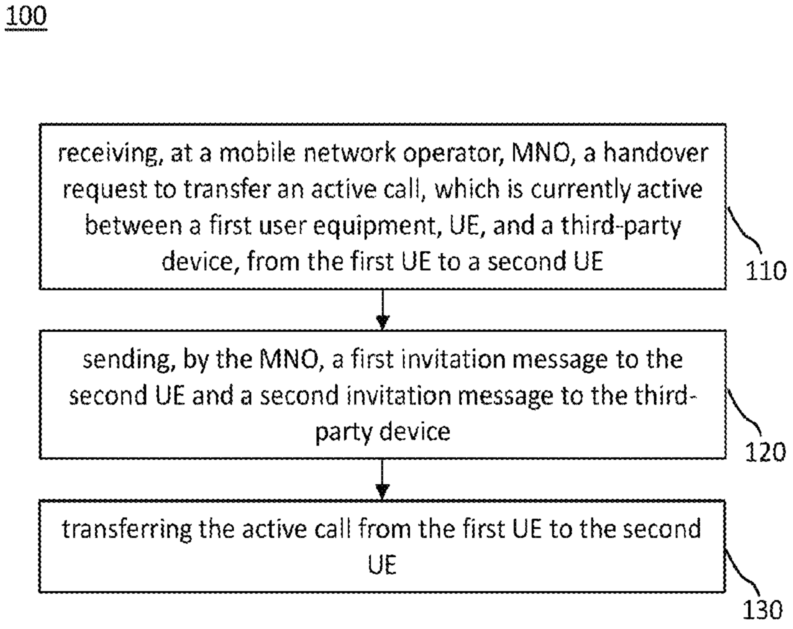
FIG. 1 shows a flow chart of method for an active call handover according to embodiments described herein.

FIG. 1 shows a flow chart of method 100 for an active call handover according to embodiments described herein.

The method 100 includes in block 110 receiving, at a mobile network operator, MNO, a handover request to transfer an active call, which is currently active between a first user equipment, UE, and a third-party device, from the first UE to a second UE; in block 120 sending, by the MNO, a first invitation message to the second UE and a second invitation message to the third-party device; and in block 130 transferring the active call from the first UE to the second UE.

The MNO may also be referred to as a wireless service provider, wireless carrier, cellular company, or mobile network carrier, and is a provider of wireless communications services that owns or controls all the elements necessary to sell and deliver services to a user. In particular, the MNO owns or controls the elements of the network infrastructure necessary to provide services to subscribers (users) over a licensed spectrum.

The UEs and the MNO communicate via a transmission medium, such as a network. In a preferred embodiment, the network is a mobile network managed by the MNO. The transmission medium may use any of various wireless communication technologies, or telecommunication standards, such as GSM, UMTS, LTE, LTE-Advanced (LTE-A), 5G, HSPA, and the like. A communication via future telecommunication standards is possible.

Figure 2:
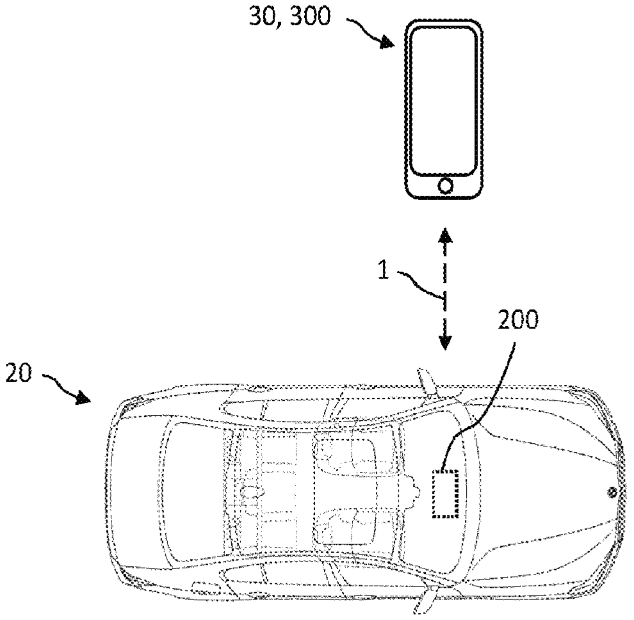
FIG. 2 shows a schematic view of a vehicle and a mobile terminal according to embodiments described herein.

FIG. 2 shows a schematic view of a vehicle 20 and a mobile terminal 30 according to embodiments described herein.

In the example shown in FIG. 2, the first UE is a vehicle 20 or a communication module 200 of the vehicle 10. The second UE is a mobile terminal 30 which includes the second communication module 300.

However, the present disclosure is not limited thereto and the embodiments may be implemented in and/or used with a number of different types of UE devices, including, but not limited to, cellular phones, tablet computers, wearable computing devices, portable media players, and any of various other computing devices.

Figure 3:
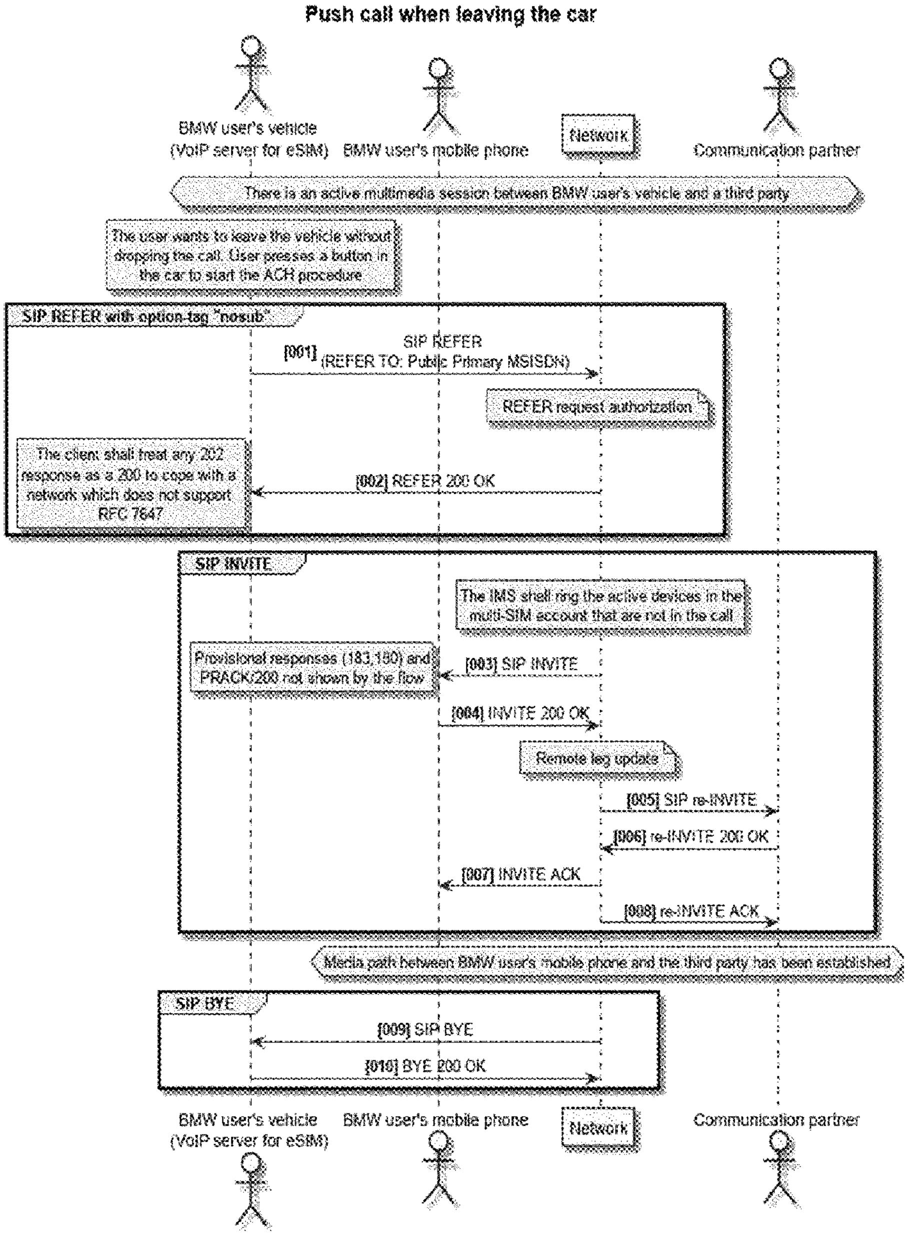
FIG. 3 shows an active call handover according to embodiments described herein.

FIG. 3 shows an active call handover according to embodiments described herein. In the example of FIG. 3, the active call is transferred from a vehicle to a mobile terminal of a user when the user leaves the vehicle.

Generally, a purpose of the Active Call Handover (ACH) is to have a stable ongoing voice call while the user is entering or leaving a vehicle. When exiting the vehicle, the call shall be handed over from the vehicle phone to the consumer's personal phone. In some embodiments, the vehicle detects whether the user is entering or leaving the vehicle, and the vehicle provides a trigger message (i.e., the handover request) for the Active Call Handover.

In some implementations, the embodiments of the preset disclosure are based on the standard 3GPP TS 24.337 Version 15, as will be explained in the following.

The network design may require coping with any kind of SIP clients with their capabilities and limitations. For the current use case, there are three devices implicated with the following requirements:

Vehicle (transferor): Requires a VoLTE device as defined in GSMA IR.92 enhanced with REFER procedure.

User's mobile phone (transfer target): VoLTE device as specified in GSMA IR.92.

Communication partner (transferee): any kind of SIP client.

In case the vehicle is involved in the original call and the user is leaving the vehicle, the message flow starts with a handover request in step 001 (e.g. SIP REFER based on the standard 3GPP TS 24.337 Version 15).

The SIP REFER header may include a REFER TO parameter set to the Public Primary MSISDN of the user's account. In more detail, the header of the handover request may include at least some of the following values:

| SIP Header | Value |
|---|---|
| Request-URI | Targeted at the same UE instance that is involved in the initial dialog as specified in RFC 3261, section 12.2.1.1 (i.e. communication partner (transferee)) |
| Contact | Registered contact id of the transferor sending the REFER (i.e. vehicle phone) |
| Refer-To | The public user identity of the user for the call being transferred, (i.e. IMPU of served vehicle user). (vehicle phone can't address to a specific UA instance which is registered to the given MSIM IMPU) |
| Accept-Contact | — |
| Expires | Time value after which Call Transfer attempt is terminated. |
| Referred-By | The public user identity of the user for the call being transferred (i.e. IMPU of served vehicle user). |
| Require | no-sub |
| Accept-Contact | (MMTEL ICSI) |
| P-Preferred-Service | (MMTEL ICSI) |
| User-Agent | User-Agent id of the transferor's client sending the REFER (user's vehicle phone client) |

All other fields may be as defined in RFC 3261 and 24.229.

The handover request in step 001 is sent by the first UE to the MNO.

In step 002, the MNO sends an OK message (REFER OK) to the first UE.

In step 003, the MNO sends the first invitation message (SIP INVITE) to the second UE.

In step 004, the second UE sends an OK message (INVITE OK) to the MNO.

In step 005, the MNO sends the second invitation message (SIP re-INVITE) to the third-party device.

In step 006, the third-party device sends an OK message (re-INVITE OK) to the MNO.

In step 007, the MNO sends an acknowledgement (INVITE ACK) to the second

UE.

In step 008, the MNO sends another acknowledgement (re-INVITE ACK) to the third-party device.

According to some embodiments, the method further includes, in step 009, sending, by the MNO, a termination message (SIP BYE) to the first UE.

In step 010, the first UE sends an OK message (BYE OK) to the MNO.

By completing the above process, the media path between the second UE (e.g. the user's smartphone) and the third-party device can be established.

Figure 4:
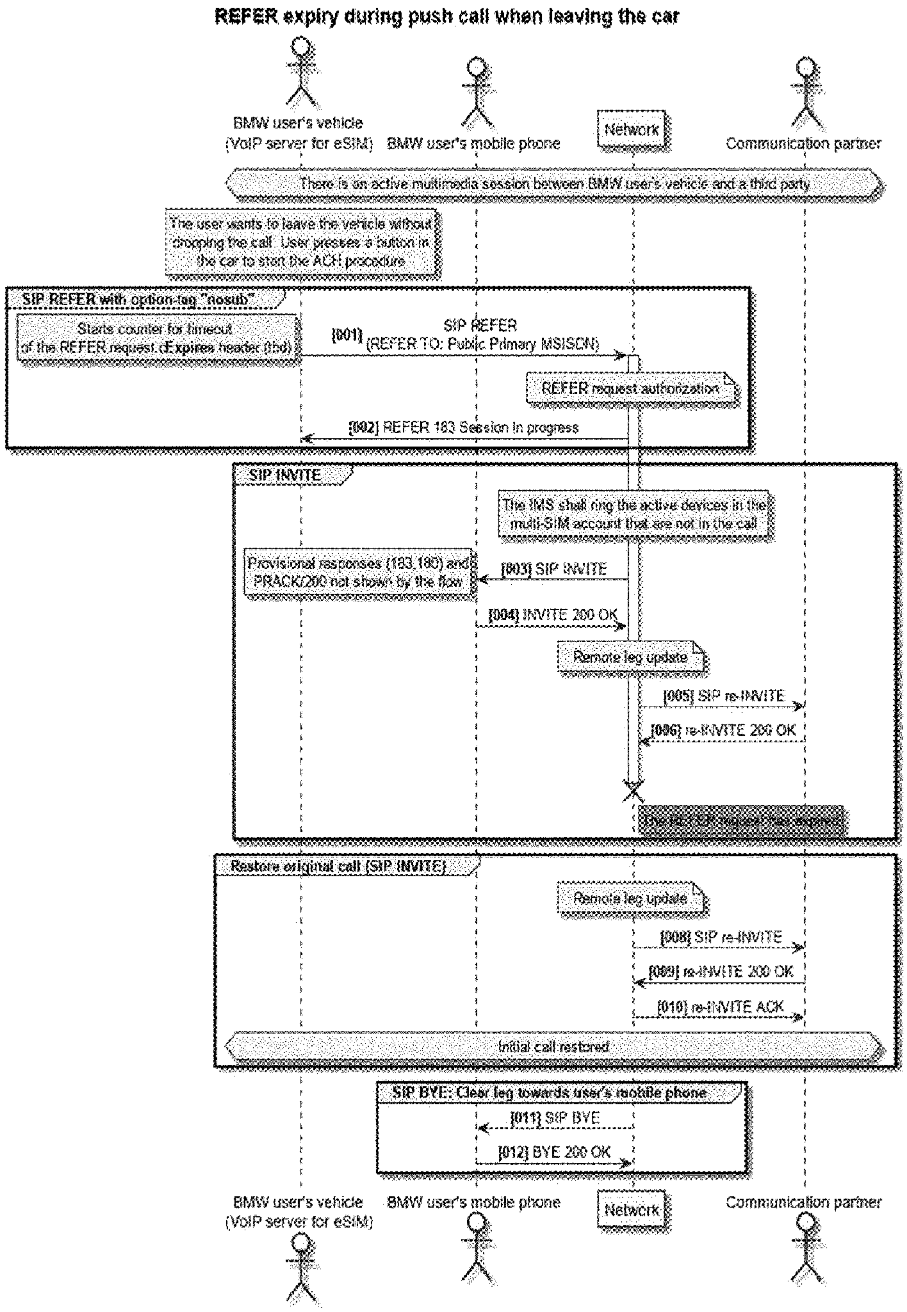
FIG. 4 shows a timeout according to embodiments described herein.

FIG. 4 shows a timeout of the handover request according to embodiments described herein.

During the transfer of the call, the third party is not on hold, that is, if the transfer execution time is too long, the third party may hang up due to interruption of the voice communication during the change of device.

Thus, according to some embodiments, if a timeout period of at least one of the handover request, the first invitation message and the second invitation message expires, the active call handover is aborted and the active call is restored between the first UE and the second UE.

In the example of FIG. 4, a timeout period of the handover request expires. If the timeout period of the handover request expires, the active call handover is aborted, and the active call is restored.

Figure 5:
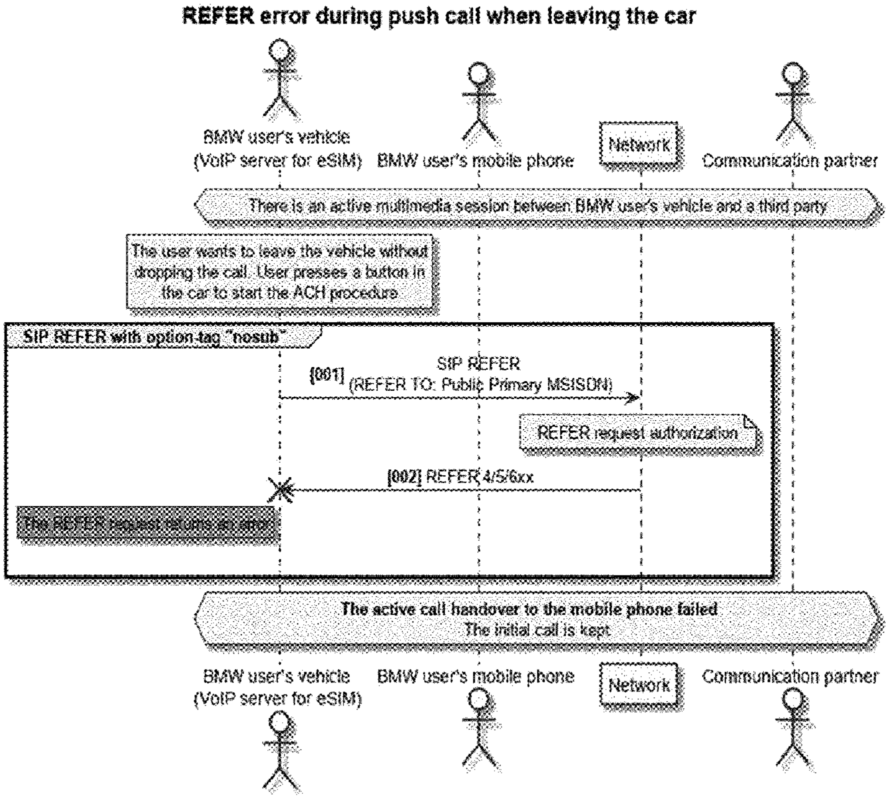
FIG. 5 shows an error according to embodiments described herein.

FIG. 5 shows an error of the handover request according to embodiments described herein.

During the transfer of the call, the third party is not on hold, that is, if the transfer execution time is too long, the third party may hang up due to interruption of the voice communication during the change of device.

Thus, according to some embodiments, if an error of at least one of the handover request, the first invitation message and the second invitation message expires, the active call handover is aborted and the active call is restored between the first UE and the second UE.

In the example of FIG. 5, an error of the handover request occurs, and the active call handover is aborted, and the active call is restored.

Figure 6:
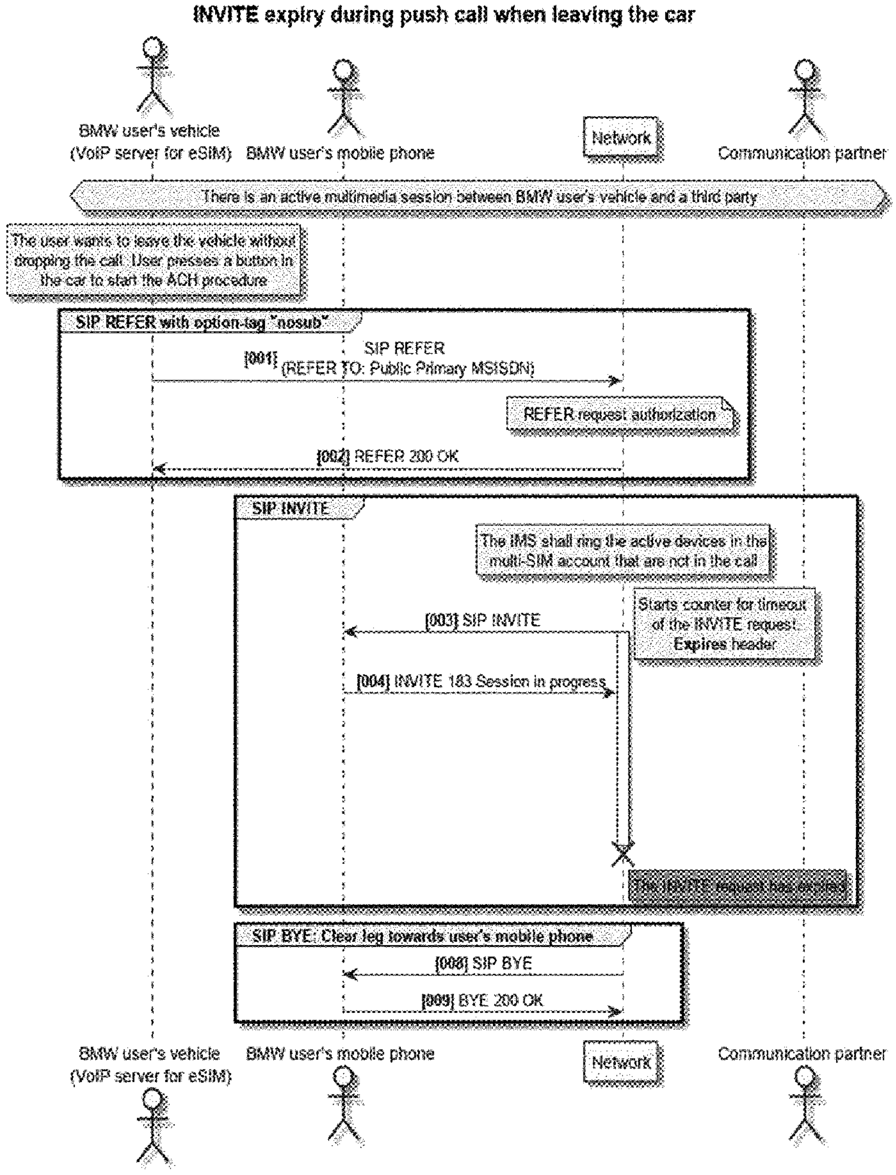
FIG. 6 shows a timeout according to further embodiments described herein.

FIG. 6 shows a timeout of the first invitation message (SIP INVITE) according to embodiments described herein.

During the transfer of the call, the third party is not on hold, that is, if the transfer execution time is too long, the third party may hang up due to interruption of the voice communication during the change of device.

Thus, according to some embodiments, if a timeout period of at least one of the handover request, the first invitation message and the second invitation message expires, the active call handover is aborted and the active call is restored between the first UE and the second UE.

In the example of FIG. 6, a timeout period of the first invitation message expires. If the timeout period of the first invitation message expires, the active call handover is aborted, and the active call is restored.

Figure 7:
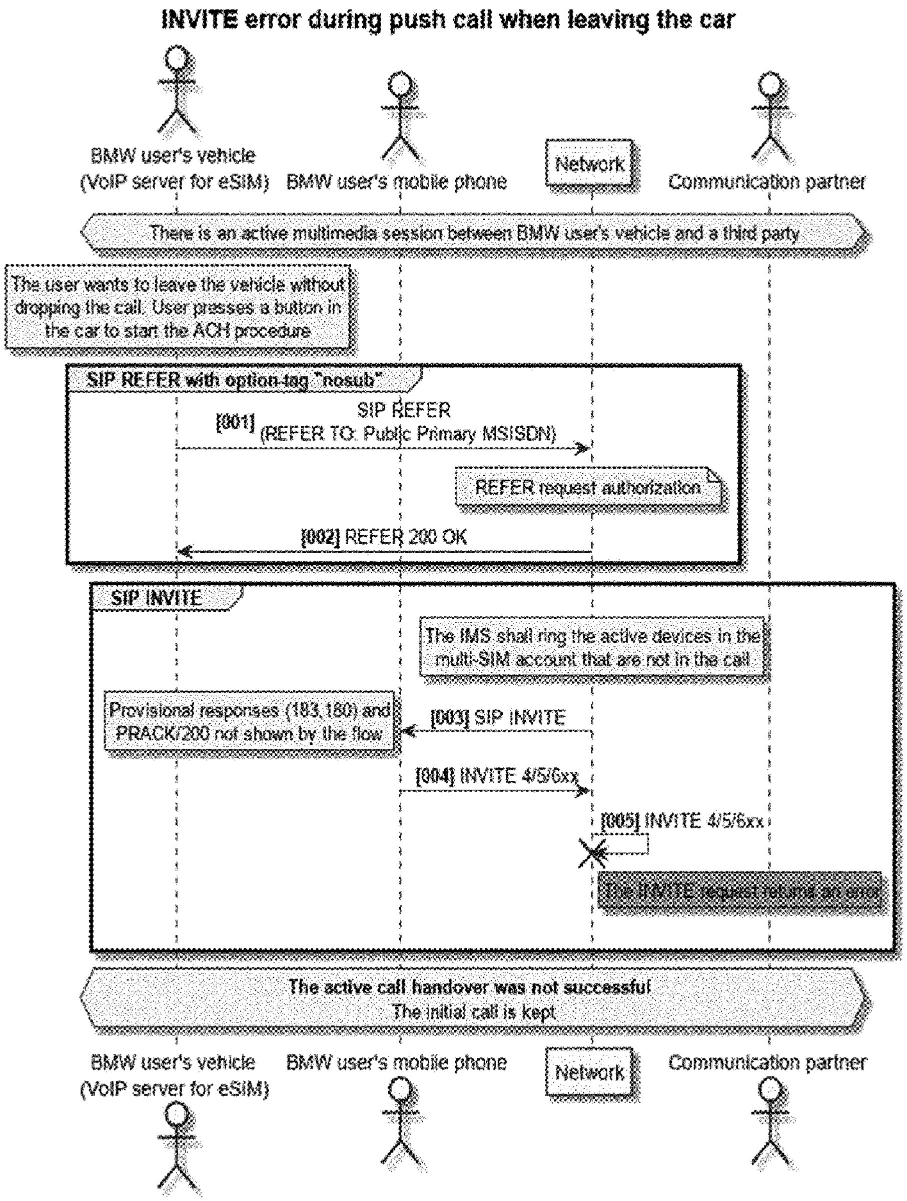
FIG. 7 shows an error according to further embodiments described herein.

FIG. 7 shows an error of the first invitation message according to embodiments described herein.

During the transfer of the call, the third party is not on hold, that is, if the transfer execution time is too long, the third party may hang up due to interruption of the voice communication during the change of device.

Thus, according to some embodiments, if an error of at least one of the handover request, the first invitation message and the second invitation message expires, the active call handover is aborted and the active call is restored between the first UE and the second UE.

In the example of FIG. 7, an error of the first invitation message occurs, and the active call handover is aborted, and the active call is restored.

Figure 8:
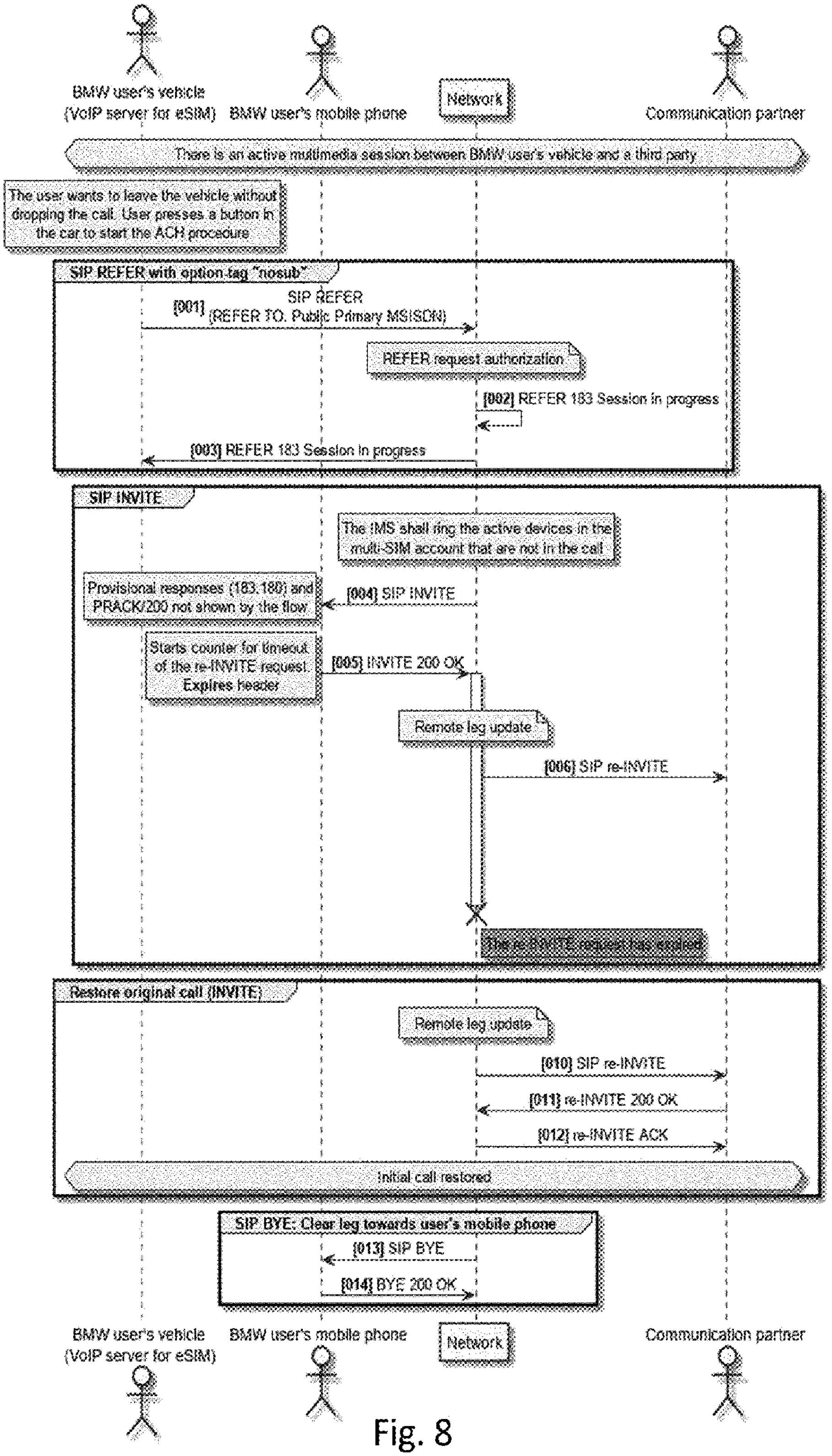
FIG. 8 shows a timeout according to further embodiments described herein.

FIG. 8 shows a timeout of the second invitation message (SIP re-INVITE) according to embodiments described herein.

During the transfer of the call, the third party is not on hold, that is, if the transfer execution time is too long, the third party may hang up due to interruption of the voice communication during the change of device.

Thus, according to some embodiments, if a timeout period of at least one of the handover request, the first invitation message and the second invitation message expires, the active call handover is aborted and the active call is restored between the first UE and the second UE.

In the example of FIG. 8, a timeout period of the second invitation message expires. If the timeout period of the second invitation message expires, the active call handover is aborted, and the active call is restored.

Figure 9:
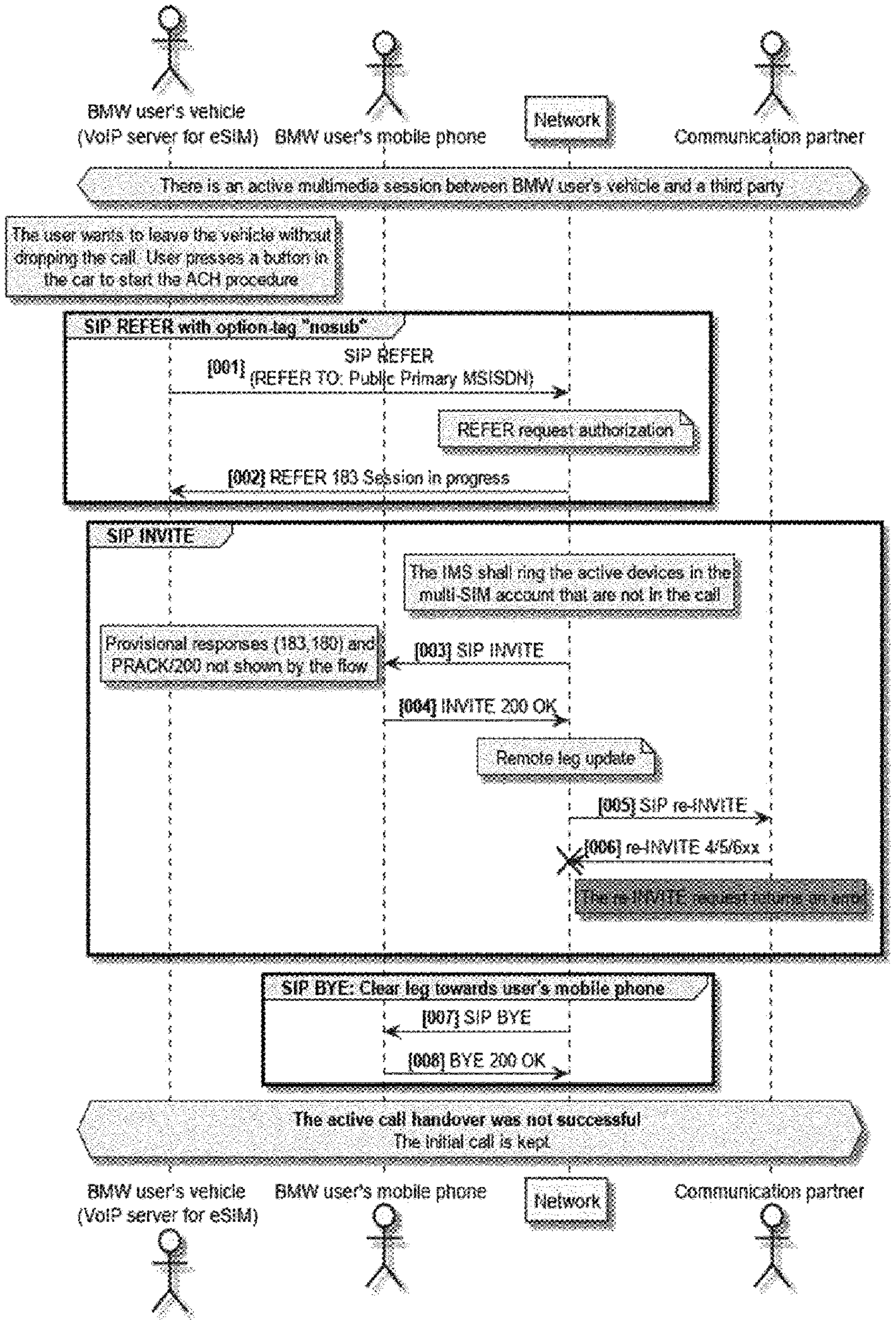
FIG. 9 shows an error according to further embodiments described herein.

FIG. 9 shows an error of the second invitation message according to embodiments described herein.

During the transfer of the call, the third party is not on hold, that is, if the transfer execution time is too long, the third party may hang up due to interruption of the voice communication during the change of device.

Thus, according to some embodiments, if an error of at least one of the handover request, the first invitation message and the second invitation message expires, the active call handover is aborted and the active call is restored between the first UE and the second UE.

In the example of FIG. 9, an error of the second invitation message occurs, and the active call handover is aborted, and the active call is restored.

Figure 10:
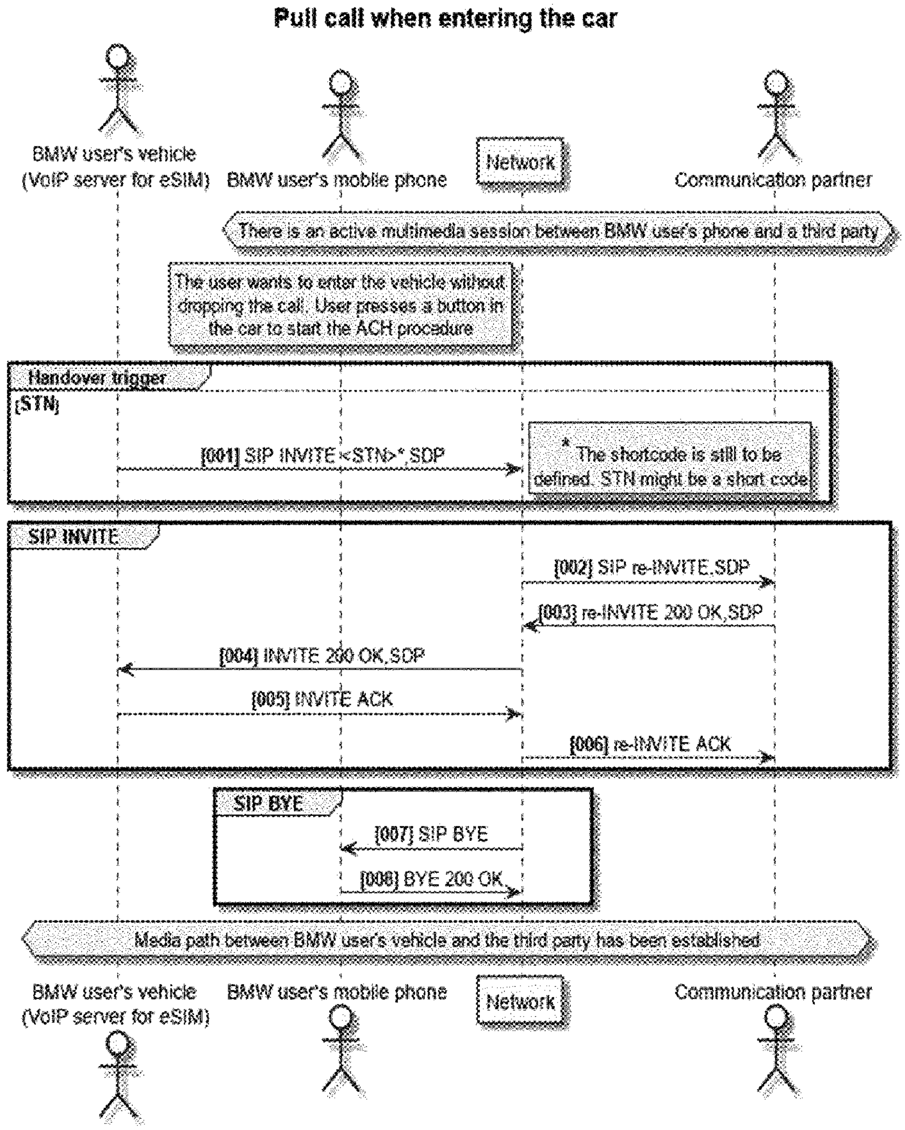
FIG. 10 shows an active call handover according to further embodiments described herein.

FIG. 10 shows an active call handover according to embodiments described herein. In the example of FIG. 10, the active call is transferred from a mobile terminal of a user to a vehicle when the user enters the vehicle.

Generally, a purpose of the Active Call Handover (ACH) is to have a stable ongoing voice call while the user is entering or leaving a vehicle. When entering the vehicle, the call shall be handed over from the user's phone to the vehicle phone with the active and enabled consumer eSIM. In some embodiments, the vehicle detects whether the user is entering or leaving the vehicle, and the vehicle provides a trigger message (i.e., the handover request) for the Active Call Handover.

In some implementations, the embodiments of the preset disclosure are based on the standard 3GPP TS 24.337 Version 15, as will be explained in the following.

The network design may require coping with any kind of SIP clients with their capabilities and limitations. For the current use case, there are three devices implicated with the following requirements:

Vehicle: transfer target

User's mobile phone: transferor

Communication partner: transferee

The handover request in step 001 is sent by the second UE to the MNO.

In step 002, the MNO sends the second invitation message (SIP re-INVITE) to the third-party device.

In step 003, the third-party device sends an OK message (re-INVITE OK) to the MNO.

In step 004, the MNO sends the first invitation message (SIP INVITE) to the second UE.

In step 005, the second UE sends an acknowledgement (INVITE ACK) to the MNO.

In step 006, the MNO sends another acknowledgement (re-INVITE ACK) to the third-party device.

According to some embodiments, the method further includes, in step 007, sending, by the MNO, a termination message (SIP BYE) to the first UE.

In step 008, the first UE sends an OK message (BYE OK) to the MNO.

By completing the above process, the media path between the first UE (e.g. the vehicle) and the third-party device can be established.

Figure 11:
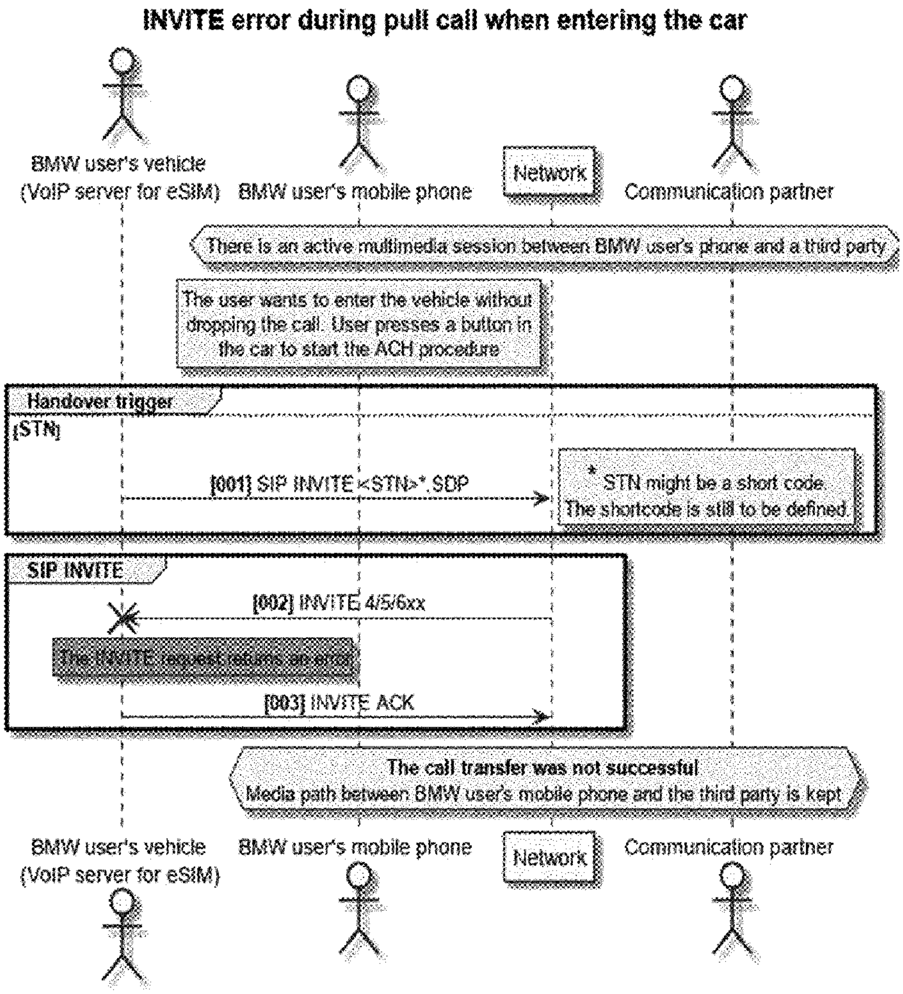
FIG. 11 shows an error according to further embodiments described herein.

FIG. 11 shows an error of the first invitation message according to embodiments described herein.

During the transfer of the call, the third party is not on hold, that is, if the transfer execution time is too long, the third party may hang up due to interruption of the voice communication during the change of device.

Thus, according to some embodiments, if an error of at least one of the handover request, the first invitation message and the second invitation message expires, the active call handover is aborted and the active call is restored between the first UE and the second UE.

In the example of FIG. 11, an error of the first invitation message occurs, and the active call handover is aborted, and the active call is restored.

Figure 12:
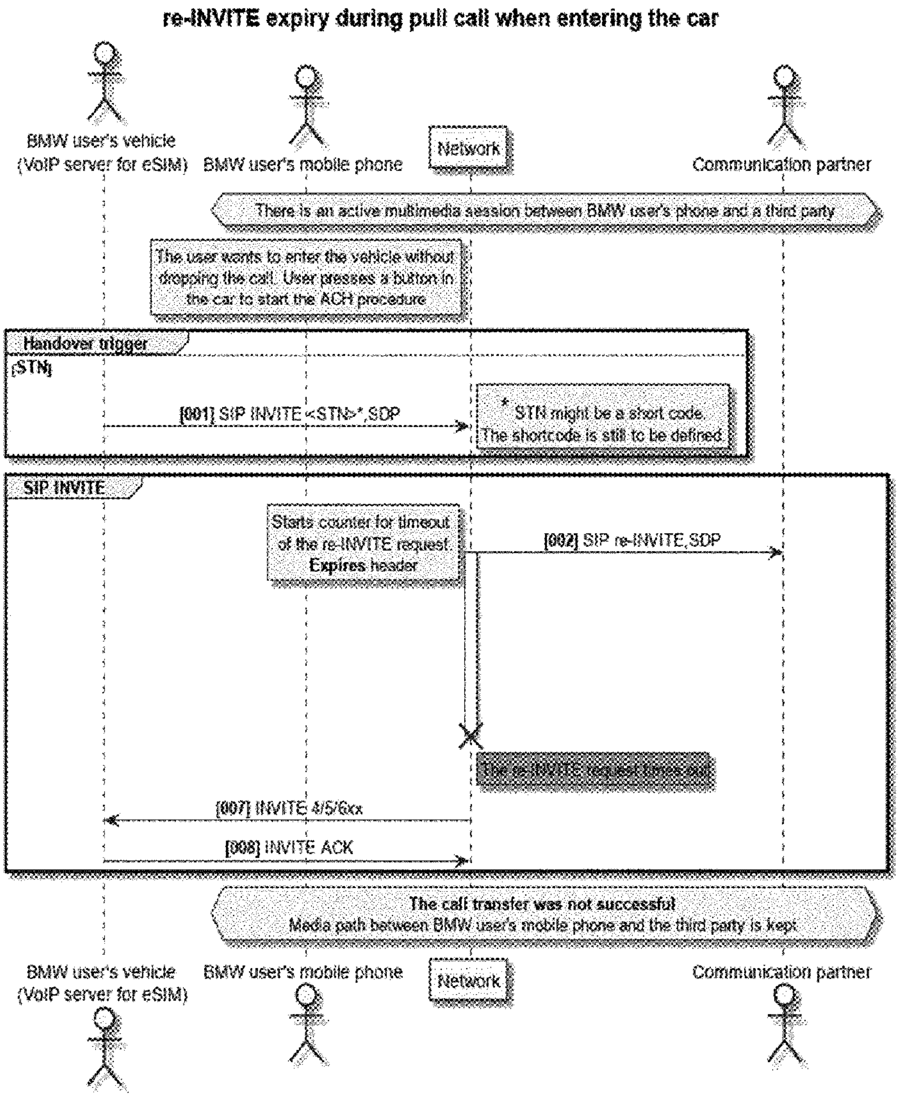
FIG. 12 shows a timeout according to further embodiments described herein.

FIG. 12 shows a timeout of the second invitation message (SIP re-INVITE) according to embodiments described herein.

During the transfer of the call, the third party is not on hold, that is, if the transfer execution time is too long, the third party may hang up due to interruption of the voice communication during the change of device.

Thus, according to some embodiments, if a timeout period of at least one of the handover request, the first invitation message and the second invitation message expires, the active call handover is aborted and the active call is restored between the first UE and the second UE.

In the example of FIG. 12, a timeout period of the second invitation message expires. If the timeout period of the second invitation message expires, the active call handover is aborted, and the active call is restored.

Figure 13:
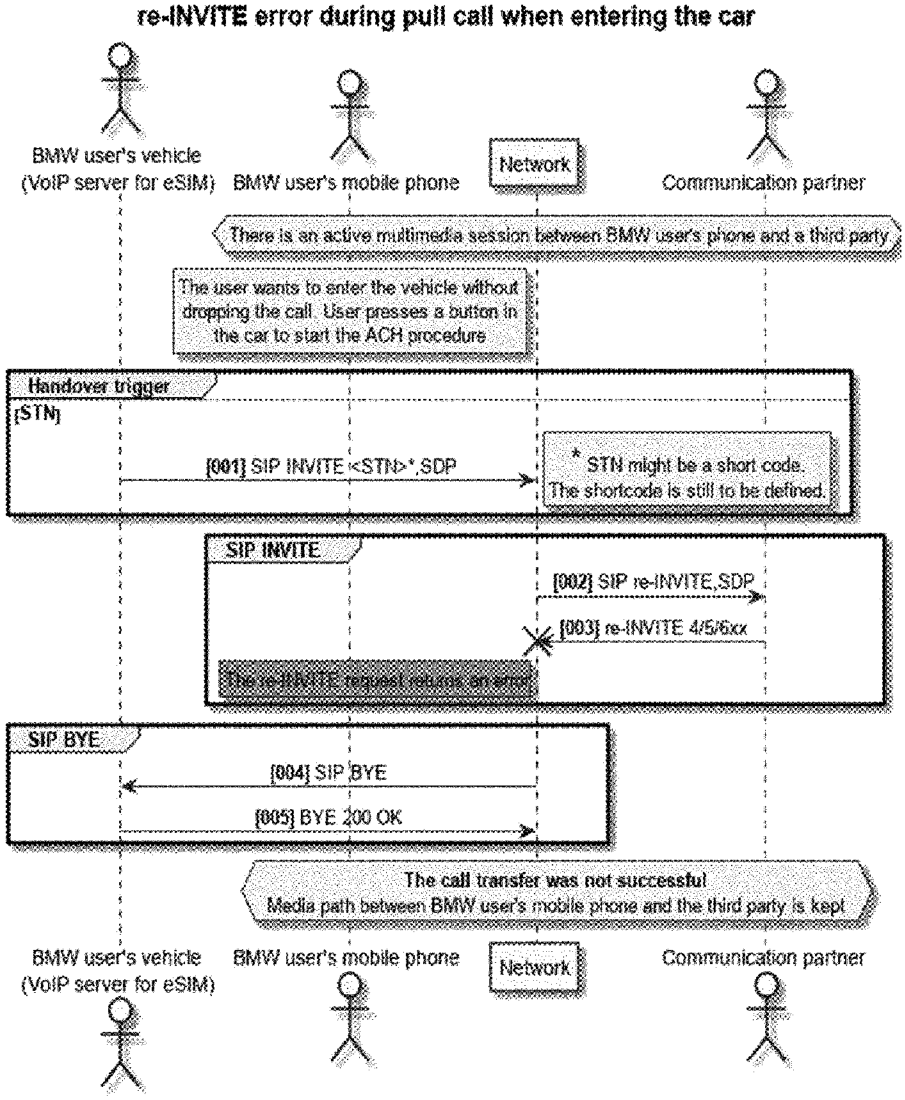
FIG. 13 shows an error according to further embodiments described herein.

FIG. 13 shows an error of the second invitation message according to embodiments described herein.

During the transfer of the call, the third party is not on hold, that is, if the transfer execution time is too long, the third party may hang up due to interruption of the voice communication during the change of device.

Thus, according to some embodiments, if an error of at least one of the handover request, the first invitation message and the second invitation message expires, the active call handover is aborted and the active call is restored between the first UE and the second UE.

In the example of FIG. 13, an error of the second invitation message occurs, and the active call handover is aborted, and the active call is restored.

While the foregoing is directed to embodiments of the disclosure, other and further embodiments of the disclosure may be devised without departing from the basic scope thereof, and the scope thereof is determined by the claims that follow.

The invention claimed is:

1. A method for an active call handover, comprising:
receiving, at a mobile network operator (MNO) from a first user equipment (UE), a handover request to transfer an active call, which is currently active between the first UE and a third-party device, from the first UE to a second UE;
sending, by the MNO and in response to receiving the handover request, a first invitation message directly to the second UE and a second invitation message directly to the third-party device; and
transferring the active call from the first UE to the second UE.

2. The method of claim 1, wherein the first UE uses a first communication profile of a user for communication over a mobile network, and wherein the second UE uses a second communication profile of the user for communication over the mobile network.

3. The method of claim 2, wherein the first communication profile and the second communication profile have a same telephone number.

4. The method of claim 2, wherein each of the first communication profile and the second communication profile is an eSIM profile of the user.

5. The method of claim 1, wherein the handover request to transfer the active call is sent by either the first UE or the second UE to the MNO.

6. The method of claim 1, further including: sending, by the MNO, a termination message to the first UE.

7. The method of claim 1, wherein the first UE and the second UE are selected from the group consisting of a mobile terminal, a communication module, a communication module of a vehicle, and a vehicle.

8. The method of claim 1, wherein at least one of: the first UE and the second UE is a mobile terminal, and the other of: the first UE and the second UE is a vehicle.

9. The method of claim 1, wherein, if a timeout period of at least one of: the handover request, the first invitation message, and the second invitation message expires, the active call handover is aborted and the active call is restored between the first UE and the third-party.

10. The method of claim 1, wherein, if an error in at least one of: the handover request, the first invitation message, and the second invitation message occurs, the active call handover is aborted and the active call is restored between the first UE and the second UE.

11. A non-transitory computer-readable storage medium comprising instructions which, when executed on one or more processors, cause the one or more processors to perform the method of claim 1.

12. A server of a mobile network operator (MNO), comprising one or more processors configured to:
receive from a first user equipment (UE) a handover request to transfer an active call, which is currently active between the first UE and a third-party device, from the first UE to a second UE;
send, in response to receiving the handover request, a first invitation message directly to the second UE and a second invitation message directly to the third-party device; and
transfer the active call from the first UE to the second UE.

13. A user equipment (UE), comprising one or more processors configured to:
send, to a mobile network operator (MNO), a handover request to transfer an active call, which is currently active between the UE and a third-party device, from the UE to another UE; and
terminate the active call after the MNO has sent, in response to receiving the handover request from the UE, a first invitation message directly to the other UE and a second invitation message directly to the third-party device.

14. A user equipment (UE), comprising one or more processors configured to:
receive, directly from a mobile network operator (MNO), a first invitation message to transfer an active call, which is currently active between another UE and a third-party device, from the other UE to the UE; and
enable the active call after the MNO has sent, in response to receiving a handover request from the other UE, the first invitation message and a second invitation message directly to the third-party device.

15. A system, comprising:
a mobile network operator (MNO) server configured to:
receive from a first user equipment (UE) a handover request to transfer an active call, which is currently active between the first UE and a third-party device, from the first UE to a second UE,
send, in response to receiving the handover request, a first invitation message directly to the second UE and a second invitation message directly to the third-party device, and
transfer the active call from the first UE to the second UE; and
the first UE configured to:
send the handover request to the MNO, and
terminate the active call after the MNO has sent, in response to receiving the handover request, the first invitation message and the second invitation message.

* * * * *